May 28, 1946.  E. S. HEBELER  2,400,992
REMOTE CONTROL FOR WELDING APPARATUS
Filed Dec. 26, 1942  2 Sheets-Sheet 1

INVENTOR
Edward S. Hebeler
BY
ATTORNEYS

Patented May 28, 1946

2,400,992

UNITED STATES PATENT OFFICE 2,400,992

REMOTE CONTROL FOR WELDING APPARATUS

Edward S. Hebeler, Williamsville, N. Y., assignor, by mesne assignments, of one-half to Unit Rays, Inc., Cleveland, Ohio, a corporation of Ohio Application December 26, 1942, Serial No. 470,186

13 Claims. (Cl. 201—48)

This invention relates to a remote control apparatus or system for electric circuits, and more particularly to a remote control apparatus or system which is especially adapted for use in electric-welding operations.

It is the general purpose and object of the invention to provide, for electric circuits such as are used for arc welding purposes, a novel means for enabling the operator to control, from the place where he may be occupied in welding, the current which he may be using at any time for welding purposes. A further and more limited object of the invention is to enable this control to be effected by means of an apparatus or system embodying pressure-fluid means for operating the element which controls the supply of current to the work. While my invention is capable of more general application, it has been found to be particularly useful in enabling the operator to suitably reduce or "fade out" the welding current when approaching the end of a weld before withdrawing the arc, thereby preventing the formation of what are known in the art as "craters" in the ends of such welds.

Figure 1:
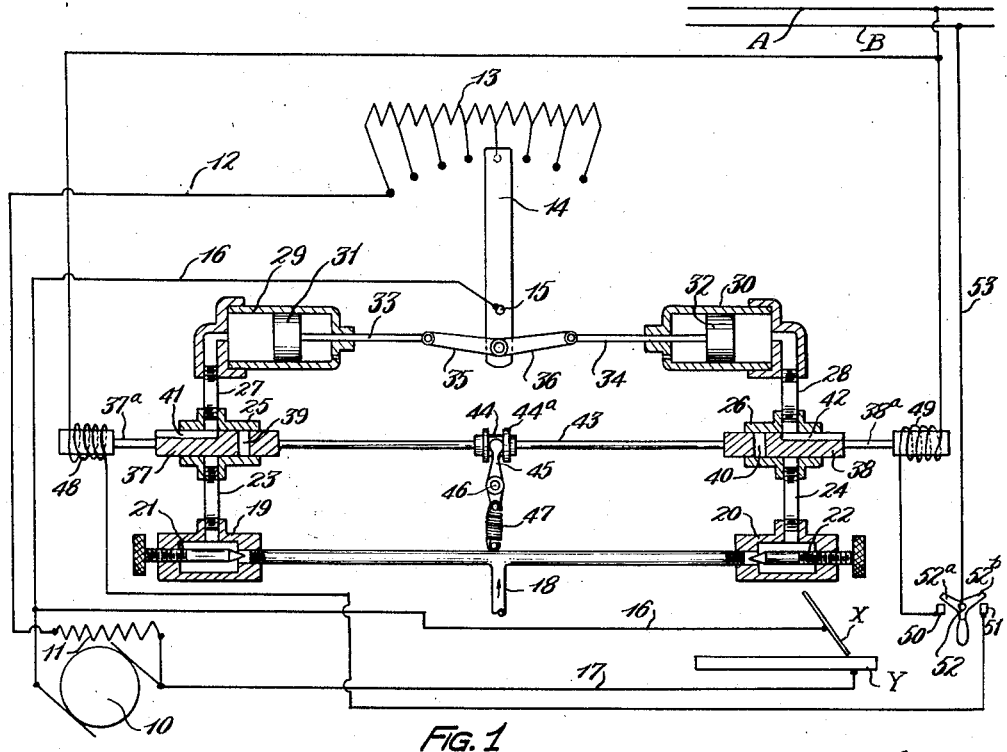
Figure 2:
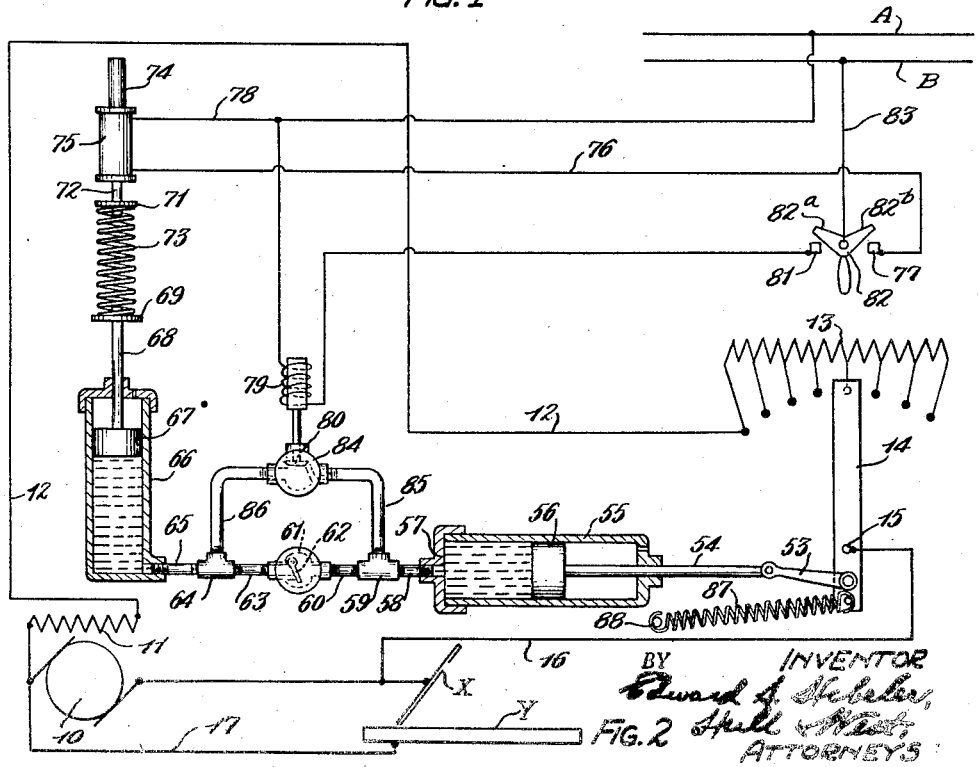
Figure 3:
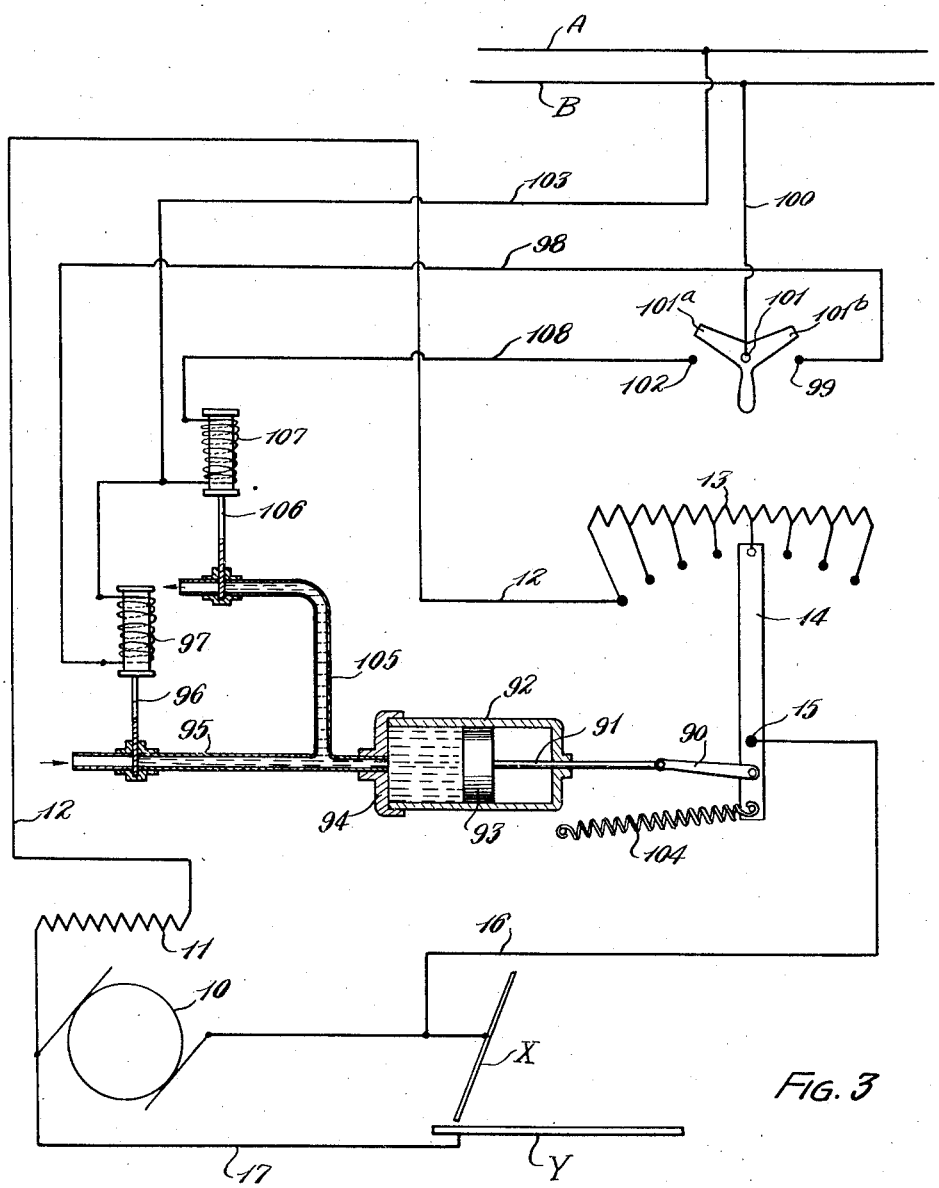

I accomplish the foregoing objects in and through the construction and arrangement of parts shown in the drawings forming part hereof wherein Fig. 1 shows a diagrammatic elevational view of one form of apparatus or system embodying my invention; and Figs. 2 and 3 views similar to Fig. 1, showing modified forms of my invention.

Describing first the embodiment of my invention shown in Fig. 1, 10 denotes the commutator and 11 the field of a welding current generator. 12 denotes a conductor which leads from the field to a variable current-controlling device, the same being shown as a rheostat 13 consisting of a plurality of resistance grids, to one end of which rheostat the said conductor is connected. 14 denotes a contact blade, pivoted above the lower end thereof at 15 and adapted, by its movement, to vary the resistance in the current flowing through the conductors 12 and 16, the electrode rod or wire X, the work piece indicated at Y, and the conductor 17.

For the purpose of enabling the operator to effect any desired variation in the current employed for welding, without leaving the location of his work and without having to remove his hand from the welding rod holder, I have provided the following pressure-fluid equipment:

18 denotes a pipe through which fluid under pressure is delivered to casings 19, 20, each equipped with a needle valve 21, 22, respectively, by which the flow of pressure fluid to each of said casings may be controlled. Pipes 23, 24 connect the casings 19, 20, respectively, with valve casings 25 and 26, respectively. These casings in turn are connected by pipes 27, 28, respectively, with the heads or rear ends of a pair of opposed cylinders 29, 30. Each of the cylinders is provided with a piston 31, 32, respectively, the rods 33 and 34 of which project respectively through the front ends of said cylinders and are connected by links 35, 36, with the lower end of the contact member 14.

For the purpose of controlling the delivery of pressure fluid to either of the cylinders 29, 30, the casings 25 and 26 are provided with sliding valves 37, 38, respectively. Each of these valves has a through port 39, 40, respectively, the former port being adapted to register with the pipes 23 and 27 and the latter port being adapted to register with the pipes 24 and 28. In addition, each valve is provided with a port 41, 42, respectively, the said ports being adapted to enable pressure fluid located between the pistons 31 and 32, respectively, and the heads or rear ends of the cylinders wherein they are respectively located, to escape, preferably to the atmosphere. As indicated, the former port is adapted to communicate with the pipe 27 and the latter port with the pipe 28. The valves 37 and 38 are connected by a common rod 43 having a collar 44 connected thereto, preferably about midway of the length thereof. The forked end of a lever 45 engages opposite sides of the collar between the flanges 44$^a$ thereof, the lever being pivoted intermediate of its ends at 46 and having its lower end connected to a coiled spring 47.

The valves 37 and 38 are provided each with a valve stem 37$^a$ and 38$^a$, respectively, the outer end of each of which valve stems constitutes the core of a solenoid the windings of which are indicated at 48 and 49, respectively. The windings 48 and 49 are each connected at one end to one of the line conductors A, and the other ends are connected respectively to contacts 50, 51 adapted to be engaged respectively by the blades 52$^a$, 52$^b$ of a switch 52, the said switch being in turn connected by a conductor 53 with the other line conductor B.

The switch 52 and the cooperating contacts 50 and 51 will be located at the place where the operator may be employed. In practice, I have mounted the switch and the contacts upon the holder for the welding rod.

With the parts occupying the positions shown in the drawings, the welding can proceed without any change in the amount of current employed. Should it be desired to increase the current, the operator rocks the switch to the right, thereby closing the circuit to the solenoid winding 48 and moving the valve 37 to a position where the port 39 registers with the pipes 23 and 27, this movement resulting in moving the valve 38 a corresponding distance to the left while avoiding the presence, in the chamber formed between the piston 32 and the head or rear end of the cylinder 30, of fluid under such pressure as will interfere with the subsequent movement of the said piston in the reverse direction. This result is accomplished, in the construction shown herein, by maintaining the venting of the said chamber to the atmosphere through the pipe 28. The pressure fluid entering the cylinder 29 will move the piston 31 in a direction to cause the contact blade 14 to cut down the resistance, this movement being practically unopposed by the piston 32 and the rapidity of movement of the contact blade being controlled by the setting of the valve 21. When the contact blade shall have moved to the desired position, the operator opens the switch, whereupon the spring 47 and lever 45 function to return the valves 37 and 38 to the positions shown in the drawings. The pistons and the contact blade, however, remain in the positions which they have assumed by virtue of the foregoing operation.

When it is desired to reduce the amount of current supplied to the welding circuit, the operator rocks the lever 52 to the left, thereby closing the circuit to the solenoid winding 49 and moving the valve 38 to a position where its port 40 will register with the pipes 24 and 28, the port 41 meanwhile continuing to vent to the atmosphere the chamber formed between the piston 31 and the head or rear of the cylinder 29. When enough resistance shall have been cut in by movement of the contact blade 14, the operator opens the switch, whereupon the contact blade will remain in the position to which it had been set, with the valves, however, in the positions in which they are shown in the drawings.

In Fig. 2 there is shown a modification of my invention, wherein the numerals 10-17 inclusive are employed to designate the parts corresponding respectively to those shown in Fig. 1. The lower end of the contact member 14 is connected by a link 53 with a piston rod 54 extending through the front end of a cylinder 55 and connected to a piston 56 therein. The opposite or rear end of the cylinder is closed by a head 57 through which a pipe 58 communicates at one end with the space between the piston and said head and at its opposite end with one of the aligned branches of a T 59, to the opposite branch of which a pipe 60 is connected and this pipe in turn is connected with a valve chamber 61 having a check valve 62 therein. This chamber in turn is connected by a pipe 65 with the rear end of a cylinder 66 having a piston 67 therein. A piston rod 68 extends through the front end of the said cylinder and is provided near its upper end with an abutment 69 between which and the abutment 71 carried by a stem 72, a coiled spring 73 is interposed. The stem 72 is connected to the core 74 of a solenoid, the winding of which is indicated at 75.

One end of the solenoid winding 75 is connected by a conductor 76 with the contact 77 and the other end of the winding is connected by a conductor 78 and the winding 79 of a solenoid valve 80 with the contact 81, the said contacts corresponding to the contacts 50 and 51 and having therebetween a switch 82 having blades 82ᵃ and 82ᵇ adapted to be brought into engagement respectively with the contacts 81 and 77. The switch itself is connected by a conductor 83 with one of the line conductors B and the conductor 78 is connected with the other line conductor A.

The valve 80 which is operated by the solenoid winding 79 is located in a casing 84. A pipe 85 connects the intermediate branch of the T 59 with the casing 84 on one side of the valve 80 and a pipe 86 connects the intermediate branch of the T 64 with the casing on the opposite side of the said valve.

87 denotes a coiled spring having one end connected to a suitable support 88 and its opposite end to the lower end of the contact member 14.

It will be seen that the pipes 65, 63, 60 and 58 and the T's 64 and 59 and the valve casing 61 and check valve 62 provide a conduit for the passage of pressure fluid from the cylinder 66 to the cylinder 55, when the piston 67 is depressed. It will also be seen that the pipes 58, 85, 86, 65, T's 59 and 64 and valve casing 84 and valve 80 provide a second conduit for the release of pressure fluid from the cylinder 55 into the cylinder 66 when the piston 56 is moved toward the left.

As is the case with the embodiment of my invention shown in Fig. 1, when the parts are in the positions shown in Fig. 2, the welding can proceed without any change in the amount of current employed. Should it be desired to reduce the current supplied to the welding electrode X and the work piece Y, the operator rocks the switch 82 to the left, thereby closing the circuit from the line conductor B through the conductor 83 and the winding 79 of the solenoid (thereby unseating the valve 80) and thence through the conductor 78 to the line conductor A. This enables the spring 87 to rock the bottom of the switch blade 14 to the left and permits the piston 56 to move to the left, the liquid being released, by such movement into the cylinder 66 by means of the indirect or branch liquid circuit including the pipes 58, 85, valve casing 84, and pipes 86 and 65. The liquid thus released lifts the piston 67 against the resistance of the spring 73.

When it is desired to increase the current supply, the operator rocks the lever 82 to the right, thereby closing the circuit from line conductor B through conductors 83 and 76 to solenoid winding 75 and thence through the conductor 78 to the line conductor A. This energizes the winding 75, causing the stem 72 to move downwardly and to exert a yielding pressure on the piston 67 through the spring 73. The piston can descend in the cylinder 66, the liquid being forced from such cylinder through the direct liquid circuit including the pipes 65 and 63, the check valve chamber 61, and the pipes 60 and 58 into the cylinder 55 and moving the piston 56 therein to the right against the resistance of the spring 87, thereby swinging the contact blade 14 to the left, whereby the resistance is cut down.

The relative strengths of the opposed springs 73 and 87 are such as to slow down the rate of movement of the contact blade to an extent which will enable any decrease or increase in the strength of current supplied to the welding zone to be effectively controlled. Furthermore, the valves 62 and 80 will in practice oppose sufficient resistance against opening by the pressure exerted thereupon by liquid in the cylinder 66 to prevent the spring 73 from forcing any liquid past either of these valves into the cylinder 55, thereby to operate the piston 56 against the resistance of the spring 87, even where the spring 73 may have been considerably compressed through the movement of the contact blade 14 to the extreme right hand end of the resistance 13. Hence, in the operation of the embodiment of my invention shown in Fig. 2, when the operator opens the switch 82, the contact blade will remain in the position to which it has been set by the preceding operation of said switch.

In Fig. 3 there is shown a still further modification of my invention wherein the numerals 10 to 17 inclusive are employed to designate the parts which correspond respectively to those shown in Figs. 1 and 2. The lower end of the contact blade 14 is connected by a link 90 with a piston rod 91 extending through the front end of a cylinder 92 and connected to a piston 93 therein. The opposite or rear end of the cylinder is closed by a head 94 through which a fluid pressure supply pipe 95 communicates at one end with the space between the piston and said head and at its opposite end with a source of pressure fluid supply (not shown).

The fluid flowing through the pipe 95 is controlled by a solenoid valve 96, the winding of which is indicated at 97. This winding is connected at one end by a conductor 98 to the contact 99. A conductor 100 connects the switch 101 with the line-conductor B, the said switch having blades 101ª and 101ᵇ adapted to be brought into engagement respectively with the contacts 102 and 99 by rocking the switch in the appropriate directions.

When the switch 101 is rocked toward the right, the circuit through the coil 97 is closed through the line-conductor B, conductor 100, contact 99, conductor 98, winding 97, and the conductor 103 to the line conductor A. When the circuit is thus closed, the valve 96 is opened, thereby to admit pressure fluid into the head or rear end of the cylinder, thereby moving the piston to the right and rocking the blade 14 in a direction to cut down the amount of resistance in the rheostat 13. This movement of the arm 14 is resisted by a spring 104, similar to and operating in the same manner as the spring 87. When the current has been increased to an extent desired by the operator, he opens the switch 101 and, the fluid between the piston 93 and the head or rear end of the cylinder being trapped by the valve 96 and by the pressure release control valve (to be described), the blade 14 will remain in whatever position it may have been placed by the operator.

For the purpose of enabling the amount of resistance in the welding circuit to be increased, thereby to reduce the amount of current used for welding purposes, I have provided the system with a fluid pressure release pipe 105 which taps the pipe 95 between the valve 96 and the head or rear end of the cylinder. The exhaust of fluid through this pipe is controlled by the solenoid valve 106, the winding of which is indicated at 107. This winding is connected at one end with the contact 102 by the conductor 108 and at its opposite end with the line conductor A by the conductor 103. When it is desired to increase the resistance in the welding circuit, the operator rocks the switch 101 to the left, thereby closing the circuit through the winding 107 and unseating the valve 106. Thereupon the spring 104 operates to move the piston 93 toward the left, with a corresponding movement of the contact blade 14 in a direction to increase the resistance in the welding circuit. When the welding current shall have been reduced to the amount desired, the operator opens the switch, whereupon the valve 106 is seated and the contact blade is held in place by the fluid trapped between the piston and the valves 96 and 106.

For convenience of illustration, the switch 82 and the contacts 77 and 81, as well as the switch 101 and the contacts 99 and 102, are shown as spaced a considerable distance from their respective electrodes X and work piece Y. In practice, however, the switches and contacts will be located in close proximity to the electrodes and the work pieces and may, as pointed out in connection with the description of the embodiment of my invention shown in Fig. 1, be mounted upon the holders for the welding rods.

Having thus described my invention, what I claim is:

1. In an electric arc welding apparatus to be employed with a metallic electrode including a welding current circuit, a variable resistance in said circuit, and a movable switch element cooperating with said resistance, opposed reciprocable members each connected with the said switch element for moving the latter in opposite directions, a source of pressure fluid supply leading to each of the said members, valves controlling the supply of pressure fluid to the said members respectively, means including an electrical circuit for operating each of the said valves, and an electric switch for controlling each of the last mentioned electrical circuits.

2. In an electric arc welding apparatus to be employed with a metallic electrode including a welding current circuit, a variable resistance in said circuit, and a movable switch element cooperating with said resitsance, a pair of cylinders having their front ends oposed to each other, a piston in each of said cylinders, rods connected to the said pistons and extending through the front ends of the cylinders and each connected to the said switch member, means for supplying fluid under pressure to the rear end portions of said cylinders, valves controlling the supply of pressure fluid to the said cylinders respectively, means including an electric circuit for operating each of said valves, and an electric switch for controlling each of the last mentioned electrical circuits.

3. In the arc welding apparatus set forth in claim 2, additional valves for controlling the supply of pressure fluid to the electrically operated valves.

4. In an electric arc welding apparatus to be employed with a metallic electrode including a welding current circuit, a variable resistance in said circuit, and a movable switch element cooperating with said resistance, a pair of cylinders having their front ends opposed to each other, a piston in each of said cylinders, rods connected to the said pistons and extending through the front ends of the cylinders and each connected to the said switch member, means for supplying fluid under pressure to the rear end portions of the cylinders, the latter means comprising a pair of valve casings each connected with a source of pressure fluid supply, a valve in each casing for controlling the rate of flow of pressure fluid through said casing, a pipe connected with each of the said valve casings, a valve casing with which each of the said pipes also communicates, pipes leading from the last mentioned valve casings to the rear end portions of the cylinders respectively, a valve in each of the last mentioned valve casings and each having a port adapted to register with the pipes communicating with such casing, means including an electrical circuit for actuating each of the last mentioned valves, and an electric switch for controlling each of the last mentioned circuits.

5. In an electric arc welding apparatus to be employed with a metallic electrode including a welding current circuit, a variable resistance in said circuit, and a movable switch element cooperating with said resistance, a pair of cylinders having their front ends opposed to each other, a piston in each of said cylinders, rods connected to the said pistons and extending through the front ends of the cylinders and each connected to the said switch member, means for supplying fluid under pressure to the rear end portions of the cylinders, the latter means comprising a pair of valve casings each connected with a source of pressure fluid supply, a valve in each casing for controlling the rate of flow of pressure fluid through said casing, a pipe connected with each of the said valve casings, a valve casing with which each of the said pipes also communicates, pipes leading from the last mentioned valve casings to the rear end portions of the cylinders respectively, a valve slidably mounted in each of the last mentioned casings and each having a through port adapted to be brought into register with the pipes communicating with such casing and each of said sliding valves having a port for venting the pressure fluid in each of the said cylinders, a rod connecting the said valves, the ports in the said valves being so arranged that when the through port of one of said valves in register with the pipes leading to and from the casing thereof the rear end of the cylinder with which the other casing is connected will be released through the venting port in the valve in the latter casing, means including an electric circuit for operating each of the last mentioned valves, and an electric switch for controlling each of the last mentioned electrical circuits.

6. In the apparatus set forth in claim 5, the circuits for operating the sliding valves comprising solenoids operatively connected with said valves, and means operatively connected with the rod which connects the said valves for automatically moving the valves to a position wherein the venting ports thereof will register with the pipes leading to the rear ends of the cylinders.

7. In the apparatus set forth in claim 5, means operatively connected with the rod which connects the said valve for automatically moving the valves to positions wherein the venting ports thereof will register with the pipes leading to the rear ends of the cylinders with which they are respectievly connected.

8. In an electric arc welding apparatus to be employed with a metallic electrode including a welding current circuit, a variable resistance in said circuit, a movable switch element cooperating with said resistance, opposed cylinders, a piston in each of said cylinders having a piston rod extending through the front end thereof, a conduit connecting the rear ends of the said cylinders, a check valve in said conduit permitting the flow of pressure fluid therethrough in one direction, a second conduit also connecting the rear ends of the said cylinders, a valve in the second conduit, means including an electric circuit for opening the last mentioned valve, thereby to permit the flow of pressure fluid in a direction the reverse of that permitted by said check valve, and an electric switch for controlling the last mentioned circuit.

9. In an electric arc welding apparatus to be employed with a metallic electrode including a welding current circuit, a variable resistance in said circuit, a movable switch element cooperating with said resistance, opposed cylinders, a piston for each of said cylinders having a piston rod extending through the front end thereof, a conduit connecting the rear ends of the said cylinders, a check valve in said conduit permitting the flow of pressure fluid therethrough in one direction, a second conduit also connecting the rear ends of the said cylinders, a valve in the second conduit, means including an electric circuit for opening the last mentioned valve, thereby to permit the flow of pressure fluid in a direction the reverse of that permitted by said check valve, a spring connected with the said movable switch element and tending to move the same in a direction opposite to that to which it is moved by the power stroke of the piston connected thereto, a solenoid the core of which is provided with an abutment, a coiled spring inserted between the said abutment and the end of the piston rod of the other cylinder, an electrical circuit including the winding of said solenoid, and an electric switch for controlling each of the last mentioned circuits.

10. In an electric arc welding apparatus to be employed with a metallic electrode including a welding current circuit, a variable resistance in said circuit, a movable switch element cooperating with said resistance, a cylinder, a piston, a rod extending through the front end of said cylinder and connected with said switch element, a pressure fluid supply pipe communicating with the rear of said cylinder for moving the piston forwardly in said cylinder, a valve in said pipe, means including an electrical circuit for operating said valve, a second pipe communicating with the rear of the said cylinder and adapted to permit pressure fluid to pass therethrough as the piston moves rearwardly in said cylinder, a valve in the second pipe, means including an electrical circuit for operating the valve in the second pipe, and an electric switch for controlling the two last mentioned circuits.

11. In the arc welding apparatus recited in claim 10, each of the electrical circuits for operating the valves in the pipes comprising a solenoid associated with one of said valves and serving, when energized, to open said valve.

12. In an electric arc welding apparatus to be employed with a metallic electrode including a welding current circuit, a variable resistance in said circuit, a movable switch element cooperating with said resistance, a cylinder, a piston, a rod extending through the front end of said cylinder and connected with said switch element, a pressure fluid supply pipe communicating with the rear of said cylinder for moving the piston forwardly in said cylinder, a valve in said pipe, means including an electrical circuit for operating said valve, a pipe communicating with the pressure fluid supply pipe between the said valve and the rear end of said cylinder and adapted to permit pressure fluid to pass therethrough as the piston moves rearwardly in said cylinder, a valve in the second pipe, means including an electrical circuit for operating the valve in the second pipe, and an electric switch for controlling the two last mentioned circuits.

13. In the arc welding apparatus recited in claim 12, each of the electrical circuits for operating the valves in the pipes comprising a solenoid associated with one of said valves and serving, when energized, to open said valve.

EDWARD S. HEBELER.